United States Patent [19]

Matsuda

[11] Patent Number: 4,458,150

[45] Date of Patent: Jul. 3, 1984

[54] MASS SPECTROMETER

[75] Inventor: Hisashi Matsuda, Takarasuka, Japan

[73] Assignee: Murata Manufacturing Co., Ltd., Japan

[21] Appl. No.: 360,005

[22] Filed: Mar. 19, 1982

[30] Foreign Application Priority Data

Mar. 23, 1981 [JP] Japan .................................. 56-42748

[51] Int. Cl.³ .......................... B01D 59/44; H01J 49/30

[52] U.S. Cl. ...................................... 250/298; 250/299

[58] Field of Search ............... 250/298, 299, 300, 281, 250/296

[56] References Cited

U.S. PATENT DOCUMENTS

| | | | |
|---|---|---|---|
| 3,500,042 | 3/1970 | Castaing et al. | 248/346 |
| 3,967,116 | 6/1976 | Geerk | 250/298 |

OTHER PUBLICATIONS

Leporskii, B. B. et al., "Stigmatic Mass Spectrometer Analyzer with Second-Order Focusing", *Sov. Phys. Tech. Phys.*, vol. 18, No. 4, (Oct. 1973), pp. 552-553.

*Primary Examiner*—Janice A. Howell
*Assistant Examiner*—Constantine Hannaher
*Attorney, Agent, or Firm*—Ostrolenk, Faber, Gerb & Soffen

[57] ABSTRACT

A mass spectrometer comprises a source for generating ions, a means for separating the ions according to mass, and means for detecting the separated ions. The mass spectrometer is characterized by that means for separating ions comprises a sector type homogenous magnetic field, and that the magnetic field has a deflection angle ranging from 110 to 135 degrees, and incident and exit angles ranging from 40 to 60 degrees.

4 Claims, 8 Drawing Figures

MASS SPECTROMETER

BACKGROUND OF THE INVENTION

1. Field of the Invention

The present invention relates to mass spectrometers and, more particularly, single focusing mass spectrometers.

The first single focusing mass spectrometer was built by Dempster and then ion optic systems with the first order approximation were completed by Herzog. Such ion optic systems are now widely used in the mass spectrometers. The instruments now put into practical application generally comprise a 60° or 90° sector type, homogeneous magnetic field with normal incident and exit angles. Some attempts have been made to improve performance of the instruments on the basis of ion optical considerations. For example, Kerwin had proposed to introduce a wide-angle focusing system into the mass spectrometers. However, none of the proposals have ever been put into practical application because of the following reasons. In the proposed ion optical systems, the ion trajectories were determined on the orbit plane without taking the influence of the magnetic fringing fields into consideration. However, the magnetic field distribution differs at the fringing field out of the orbit plane even in the homogeneous magnetic field. This results in the deviation of ion trajectories, which causes aberration. For this reason, it is impossible to produce mass spectrometers with high performance using this approach.

Recently, a trajectory calculation method has been developed for determining the trajectories of ions passing through the magnetic fringing field, with accuracy to the third order approximation, making it possible to calculate second and third order aberrations in any ion optic system. Using this method, the ion optic systems in the conventional instruments were investigated. The results showed that these single-focusing mass spectrometers have aberration problems awaiting solution.

It is an object of the present invention to provide a single-focusing mass spectrometer with low aberration coefficients and a high resolving power.

Another object of the present invention is to provide a small-sized single-focusing mass spectrometer.

Still another object of the present invention is to provide an ion optical system for single-focusing mass spectrometers that makes it possible to obtain high resolving power and small aberrations and to construct small-sized mass spectrometers with these features.

According to the present invention there is provided a mass spectrometer comprising a source for generating ions, a means for separating the ions according to mass, and means for detecting the separated ions, characterized in that said means for separating ions comprises a sector type homogeneous magnetic field with a deflection angle ranging from 110 to 135 degrees, and incident and exit angles ranging from 40 to 60 degrees from the normal.

The invention will be further apparent from the following description taken in conjunction with the accompanying drawings.

BRIEF DESCRIPTION OF THE DRAWINGS

Referring now to FIG. 1, there is shown a mass spectrometer which generally comprises a source for generating ions, a means for separating the ions according to mass and means for detecting separated ions. In the drawing, 1 is a sector type homogeneous magnetic field, 2 an ion source, 3 a slit, 4 an ion beam, 5 a collector slit, and 6 an ion collector. The ion beam starting from the ion source 2 meets the incident and exit boundary surfaces of the magnetic field at predetermined angles ($\epsilon_1$, $\epsilon_2$). ($\phi_m$) is a deflection angle in the magnetic field, ($r_m$) is a radius of trajectory of the ion beam 4, ($\epsilon_1$) and ($\epsilon_2$) are incident and exit angles of the ion beam 4, respectively, $L_1$ is a distance between the slit 3 and the entrance of the magnetic field 1, $L_2$ is a distance from the magnetic field 1 to the collector slit 5, $R_1$ and $R_2$ are radii of curvature of the boundary surfaces of the magnetic field 1.

Figure 1:
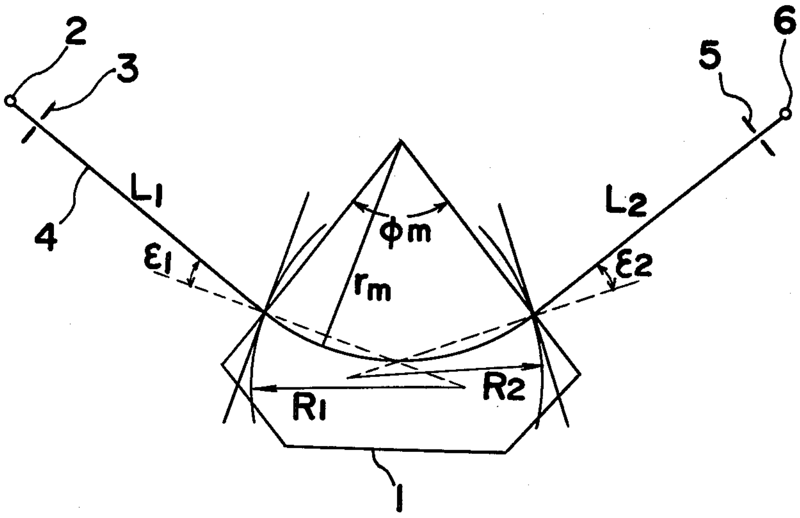
FIG. 1 is a schematic diagram of a single-focusing mass spectrometer with a sector type homogeneous magnetic field.

A deviation from the axis of ions that travels from the ion source 2 to the collector 6, i.e., the length of deviation $X_g$ is given, in the second order approximation, by the following equation (1):

$$X_g = A_xX + A_\gamma\gamma + A_{\alpha\alpha}\alpha^2 + A_{yy}Y^2 + A_{y\beta}Y\beta + A_{\beta\beta}\beta^2 \qquad (1)$$

where X and Y are coordinates of ions within the objective slit 3, ($\alpha$) and ($\beta$) are radial and axial inclinations of the ion beam, ($\gamma$) is a ratio of mass deviation, $A_x$ is an image magnification, $A_\gamma$ is a mass dispersion coefficient. The other coefficients which have influence on the aberration preferably have values as small as possible. Under the normal conditions, ($\alpha$) and ($\beta$) are not more than 0.01. The third order coefficients less than 100 may be neglected in instruments with a resolving power of 1000 or less.

As a means for increasing the resolving power, one may first consider making $L_1$ and $L_2$ asymmetric. It is known that the selection of a ratio between $L_1$ and $L_2$ enables one to obtain any desired image magnification $A_x$. Also, the resolving power (R) of a mass spectrometer is given by the following equation (2):

$$R = A_\gamma/2(s \cdot A_x + \Delta) \qquad (2)$$

where s is the width of the ion source slit, $A_\gamma$ is the mass dispersion, $A_x$ is the image magnification, and ($\Delta$) is the image dispersion due to the aberration.

Figure 4:
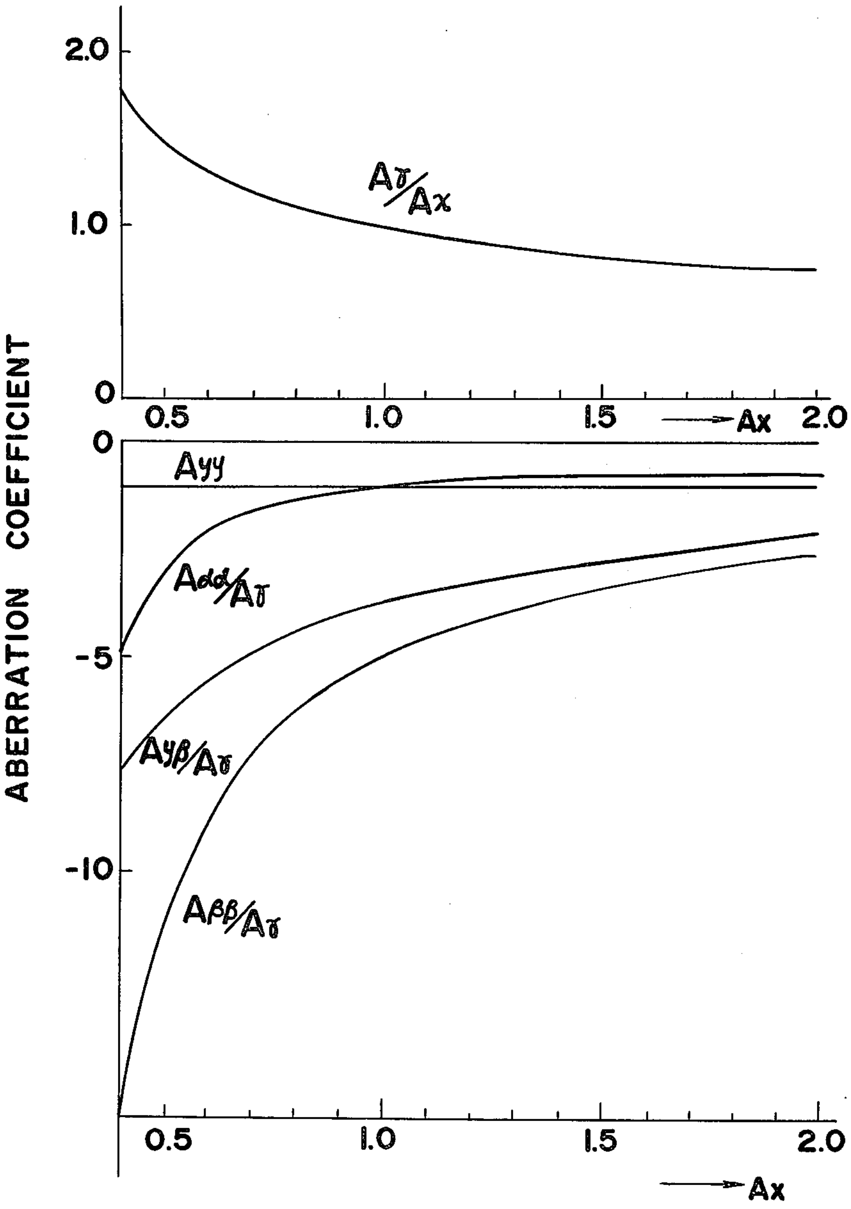
FIG. 4 is a graph showing variations of various aberrations with the change of image magnification ($A_x$)

From the equation (2), it will be seen that the smaller $A_x$ is, the larger the resolving power will be, taking no account of ($\Delta$). However, the calculation of the aberration coefficients for various $A_x$ shows that the smaller $A_x$ is, the greater the aberration will be, by a considerable amount. For example, in the sector type magnetic field with a deflection angle of 90° and a magnet gap of 0.05 rm, the aberration varies with the change of $A_x$ as shown in FIG. 4. From this figure, it will be seen that, when $A_x$ is 0.5, $A_{\alpha\alpha}$ is 3 times greater than at $A_x=1$, and $A_{y\beta}$ and $A_{\beta\beta}$ are 2 times greater than those at $A_x=1$. Thus, the resolving power would be decreased because (Δ) in the equation (2) becomes large as $A_x$ becomes small. It is therefore not preferred to make $L_1$ and $L_2$ asymmetric. In FIG. 4, the aberration coefficients are given by the ratio of each aberration coefficient to $A_\gamma$ because the ratio of the magnitude of aberration to the magnitude of mass dispersion becomes a serious problem when considering the resolving power.

The influence of curved boundaries at the entrance and exit of the magnetic field on the aberration may then be investigated.

When the magnetic field has curved boundaries at its entrance and exit with radii of curvature $R_1=R_2=r_m \cdot \cot^3 \frac{1}{2}\phi_m$, the second order focusing on (α) can be obtained under the conditions: $R_1=R_2=r_m$ when $\phi_m$ is 90°, or $R_1=R_2=0.192\ r_m$ when $\phi_m$60°. The calculated values of other aberration coefficients are shown in Table 1. For comparison, the data for magnetic fields with straight boundary surfaces are also shown on the first and third lines in Table 1.

TABLE 1

| $\phi_m$ | $r_m/R_1$ | $r_m/R_2$ | $A_{\alpha\alpha}$ | $A_{yy}$ | $A_{y\beta}$ | $A_{\beta\beta}$ | $A_x$ |
|---|---|---|---|---|---|---|---|
| 90° | 0 | 0 | −1 | −1.04 | −3.77 | −4.96 | 1 |
| 90° | 1 | 1 | 0 | −2.08 | −7.49 | −8.87 | 1 |
| 60 | 0 | 0 | −1 | −1.03 | −4.69 | −6.59 | 1 |
| 60 | 0.192 | 0.192 | 0 | −1.37 | −6.23 | −8.41 | 1 |

From the data in Table 1, it can be seen that the aberration ($A_{\alpha\alpha}$) becomes 0 in the magnetic field with curved boundaries, whereas other aberrations are larger than those in the magnetic field with straight boundaries at the entrance and exit. Thus, it can be said to be undesirable to use the magnetic field with curved boundaries for decreasing aberrations when $\phi_m$ is 90° or 60° as in Table 1.

Figure 5:
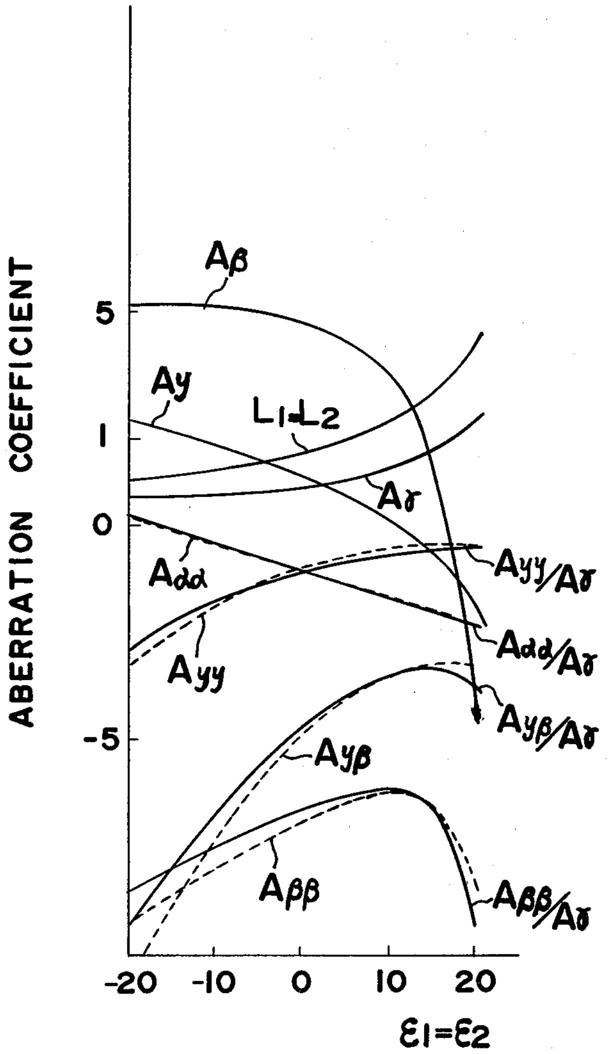
FIGS. 5, 6 and 7 are graphs showing variations of second order aberration coefficients and various ion optical parameters with the change of incident and exit angles ($\epsilon_1$, $\epsilon_2$) for magnetic fields with deflection angles of 60°, 90° or 130°, respectively.
Figure 6:
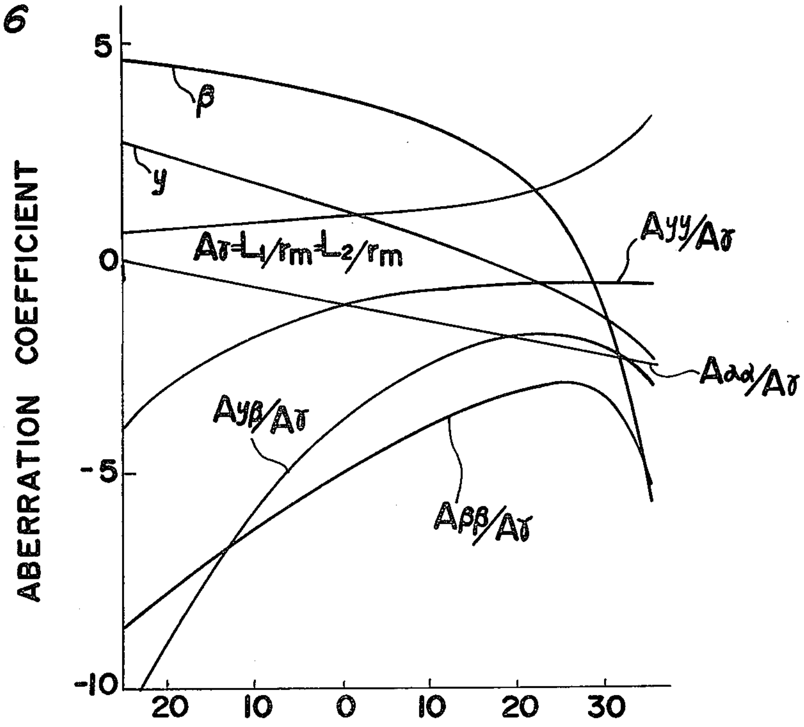
Figure 7:
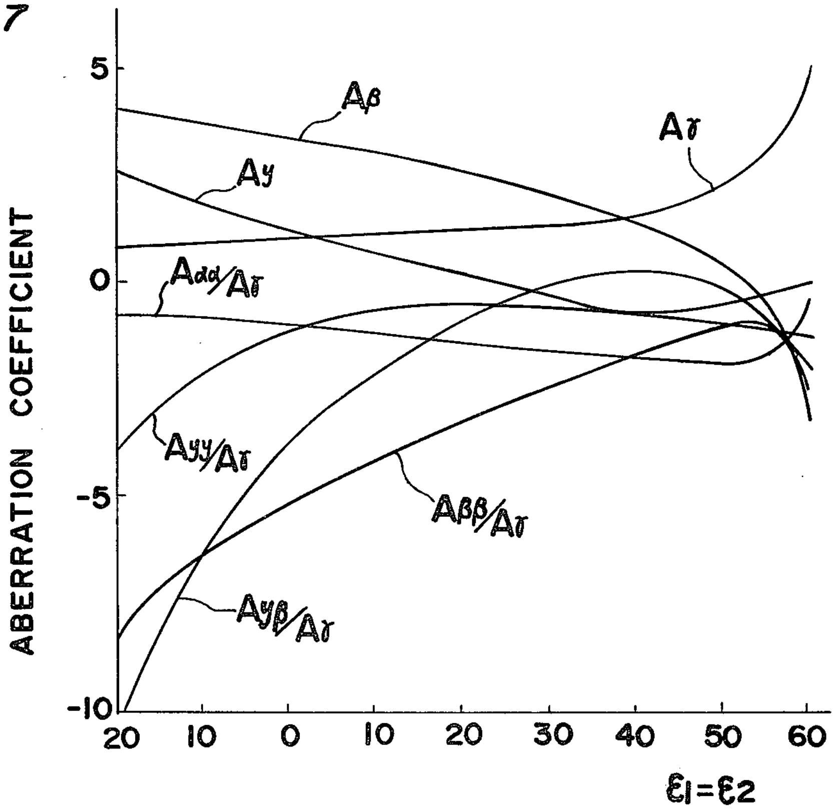

Further investigations have been made on variation of four second order aberrations and other important ion optical parameters with the change of incident and exit angles ($\epsilon_1$, $\epsilon_2$) and that of deflection angles ($\phi_m$) in the magnetic field with straight boundaries at the entrance and exit. Results are shown in FIGS. 5 to 7. FIG. 5 shows the results for the magnetic field with a deflection angle ($\phi_m$) of 60° and a magnet gap distance of 0.025 $r_m$. FIG. 6 shows the results for the magnetic field with a deflection angle of 90° and a magnet gap of 0.025 $r_m$. FIG. 7 shows the results for magnetic field with a deflection angle of 130° and a magnet gap of 0.0333 $r_m$.

As can be seen from these figures, the use of magnetic field with a deflection angle of 130° enables one to obtain larger mass dispersion and smaller aberration coefficient when used with inclined, incident and exit angles, as compared with the conventional magnetic field of which the deflection angle is 60° or 90°.

EXAMPLES

Figure 8:
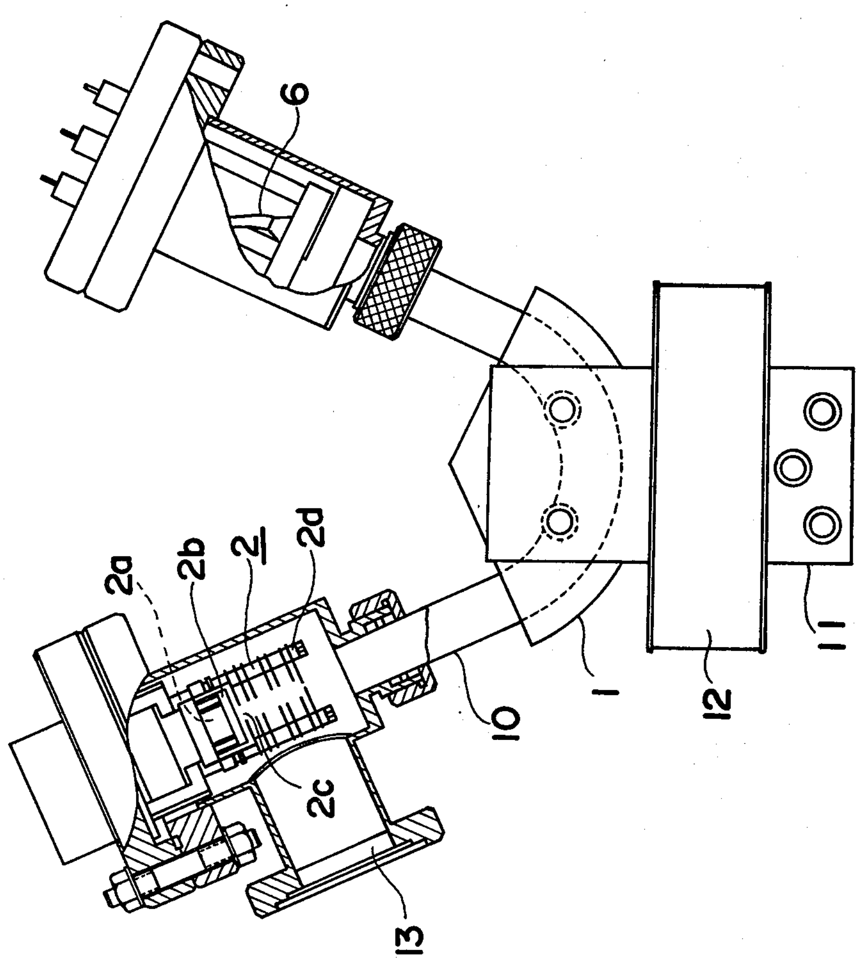
FIG. 8 is a schematic view of the mass spectrometer according to the present invention.

The mass spectrometer of the invention may be constructed in one embodiment as shown in FIG. 8, the deflection angle ($\phi_m$), the incident angle ($\epsilon_1$) and the exit angle ($\epsilon_2$) taking the values shown in Table 2. Table 2 also shows the respective values of $r_m/R_1$, $r_m/R_2$, $L_1=L_2$, $A_\gamma$, $A_{\alpha\alpha}/A_\gamma$, $A_{yy}/A_\gamma$, $A_{y\beta}/A_\gamma$, $A_{\beta\beta}/A_\gamma$, $A_y$ and $A_\beta$.

The mass spectrometer comprises an ion source 2, a magnetic field 1 and an ion collector 6 connected to a detecting means. The ion source 2 comprises a filament mount *2a*, an ionization chamber *2b* and a drawing-out electrode *2c*, which are assembled on supporting rods *2d* mounted on one end of a V-shaped metal tube 10. The magnetic field 1 is formed by a magnetic core 11 arranged on the metal tube 10, and an exciting coil 12 wound thereon. The ion collector 6 is mounted on the other end of the metal tube 10. Numeral 13 is an inlet for introducing a gaseous sample to be analyzed.

TABLE 2

| $\phi_m$ (°) | $\epsilon_1=\epsilon_2$ (°) | $r_m/R_1$ | $L_1=L_2$ | $A_\gamma$ | $A_{\alpha\alpha}A_\gamma$ | $A_{yy}/A_\gamma$ | $A_{y\beta}/A_\gamma$ | $A_{\beta\beta}/A_\gamma$ | $A_y$ | $A_\beta$ |
|---|---|---|---|---|---|---|---|---|---|---|
| 60 | 0 | 0 | 1.732 | 1 | −1 | −1.03 | −4.68 | −6.59 | 1.12 | 4.76 |
| 90 | 0 | 0 | 1 | 1 | −1 | −1.12 | −4.12 | −5.23 | 1.25 | 3.93 |
| 110 | 44 | 0 | 2.209 | 3.06 | −2.18 | −0.42 | −1.36 | −2.13 | −1.35 | −1.79 |
| 120 | 50 | 0 | 1.923 | 3.18 | −2.02 | −0.40 | −1.07 | −1.58 | −1.18 | −1.39 |
| 130 | 56 | 0 | 1.629 | 3.20 | −1.62 | −0.19 | −0.98 | −1.00 | −1.04 | −0.82 |
| 135 | 59 | 0 | 1.489 | 3.17 | −1.23 | 0.06 | −1.34 | −0.43 | −1.03 | −0.44 |
| 140 | 62 | 0 | 1.366 | 3.11 | −0.59 | −0.29 | −2.42 | 1.48 | −0.98 | 0.16 |
| 130 | 55 | 0.25 | 1.716 | 3.24 | −0.08 | −0.26 | −0.96 | −1.15 | −1.06 | −1.01 |
| 135 | 57 | 0.305 | 1.566 | 3.15 | 0 | 0 | −0.90 | −0.60 | −1.02 | −0.67 |

In all cases, $r_m=1$.

In Table 2, $A_y$ and $A_\beta$ are the coefficients which give deviation of the ion beam in the Y direction, $r_m/R_1$, $r_m/R_2$ are the values obtained by dividing ion orbit radii of the ion beam by the radius of curvature of the boundary surface of the magnetic field at the entrance and exit. The value 0 for $r_m/R_1$ or $r_m/R_2$ means that the magnetic field has a straight boundary surface at the entrance or exit. The magnetic gap distance is 0.133 $r_m$.

As can be seen from the Table 2, it is possible to obtain high resolving power and small aberration coefficient by selecting the deflection angle within the range of 110° to 135° and the incident and exit angles within the range of 35° to 60°. Also, all the aberration coefficient can be further decreased by the use of the magnetic field with curved boundary surfaces at the entrance and exit as shown in the last two lines of Table 2.

Figure 2:
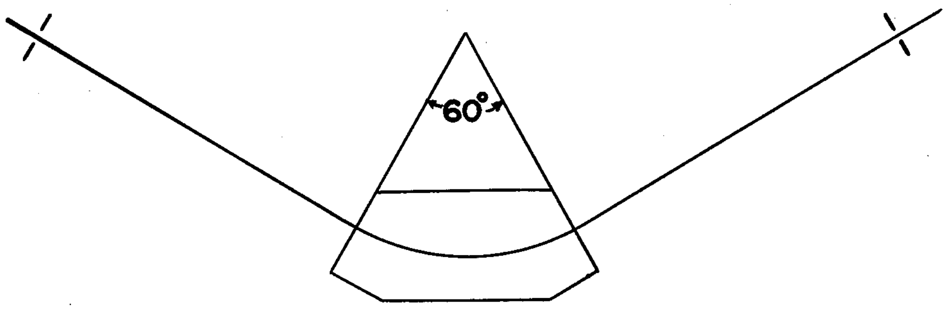
FIG. 2 is a plane view of a sector type homogeneous magnetic field of a conventional mass spectrometer, with a deflection angle of 60° and normal incident and exit angles.
Figure 3:
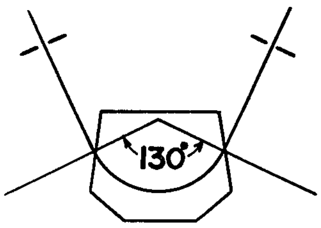
FIG. 3 is a plane view of a sector type homogeneous magnetic field of a mass spectrometer according to the present invention, with a deflection angle of 130° and oblique incident and exit angles.

The size of the magnetic field ($\phi_m=130°$, $\epsilon_1=\epsilon_2=55°$) according to the present invention was compared with that of the conventional device ($\phi_m=60°$, $\epsilon_1=\epsilon_2=90°$). FIGS. 2 and 3 show the plane views of the magnetic fields of the conventional device and the present invention, respectively, reduced to the same scale. From these figures, it will be seen that the present invention makes it possible to produce small-sized mass spectrometers since the magnetic field can be reduced in size.

In the mass spectrometer according to the present invention, the magnetic gap has a greater influence on the second order aberrations as compared with the conventional ones with the normal incident and exit angles, but the aberration coefficients can be decreased by making the magnetic gap large. Since, the ion optic system according to the present invention has a mass dispersion three times that of the conventional ones, it is possible to shorten the radius of the magnetic field of the former to obtain performance of the former equal to that of the latter.

What I claim is:

1. A mass spectrometer comprising a source for generating ions, a means for separating the ions according to mass, and means for detecting the separated ions, said means for separating ions comprising a sector type homogeneous magnetic field, the magnetic field having a deflection angle ranging from 110 to 135 degrees, and an incident surface for entering ions from the source and an exit surface for exiting ions to the detecting means, the ions crossing the incident and exit surfaces at respective incident and exit angles equal to each other and ranging from 40 to 60 degrees from the normal.

2. The mass spectrometer of claim 1 wherein the source comprises a first slit and the detecting means comprises a second slit, the deflection angle of the magnetic field having a bisector, the first slit and second slit, the incident angle and exit angle each being symmetrical with respect to the bisector of the deflection angle.

3. The mass spectrometer of claim 1 wherein the source comprises a first slit and the detecting means comprises a second slit, the ions following a first path from the first slit to the incident surface and a second path from the exit surface to the second slit, the lengths of the first and second paths being equal.

4. The mass spectrometer of claim 1 in which the incident and exit surfaces are curved.

* * * * *